United States Patent
Murotani

(10) Patent No.: US 8,149,669 B2
(45) Date of Patent: Apr. 3, 2012

(54) OPTICAL DISK APPARATUS AND A FOCUS-JUMPING CONTROL METHOD THEREOF

(75) Inventor: Shigeru Murotani, Kawasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 608 days.

(21) Appl. No.: 10/985,041

(22) Filed: Nov. 10, 2004

(65) Prior Publication Data

US 2005/0207304 A1 Sep. 22, 2005

(30) Foreign Application Priority Data

Mar. 17, 2004 (JP) ................. 2004-075723

(51) Int. Cl.
*G11B 7/085* (2006.01)
*G11B 7/00* (2006.01)
*G11B 21/08* (2006.01)

(52) U.S. Cl. .............. 369/53.24; 369/13.07; 369/47.31; 369/47.22; 369/47.27; 369/30.1

(58) Field of Classification Search ............. 369/30.1, 369/279, 284, 275.3, 286, 47.34, 53.23, 44.27, 369/53.19, 53.24, 13.07, 13.39–13.42, 47.31, 369/47.22, 47.27; 710/43; 360/72.1, 72.2
See application file for complete search history.

(56) References Cited

U.S. PATENT DOCUMENTS

| | | | | |
|---|---|---|---|---|
| 5,465,245 A | * | 11/1995 | Yanagawa | 369/53.24 |
| 5,668,789 A | * | 9/1997 | Yokota et al. | 369/47.11 |
| 5,781,516 A | * | 7/1998 | Yamada | 369/30.13 |
| 5,872,767 A | * | 2/1999 | Nagai et al. | 369/275.3 |
| 5,920,526 A | * | 7/1999 | Udagawa | 369/30.15 |
| 6,577,563 B1 | * | 6/2003 | Iwamoto | 369/32.01 |
| 6,608,809 B2 | | 8/2003 | Tanaka et al. | |
| 6,704,252 B2 | * | 3/2004 | Aso et al. | 369/30.11 |
| 6,795,389 B1 | * | 9/2004 | Nishiuchi et al. | 369/275.3 |
| 2001/0017822 A1 | * | 8/2001 | Aso et al. | 369/32 |
| 2002/0054548 A1 | * | 5/2002 | Tateishi | 369/44.27 |
| 2004/0062179 A1 | | 4/2004 | Tsurumi et al. | |
| 2004/0076084 A1 | * | 4/2004 | Yonezawa | 369/30.1 |

(Continued)

FOREIGN PATENT DOCUMENTS

CN 1475997 2/2004

(Continued)

*Primary Examiner* — Wayne Young
*Assistant Examiner* — Dionne Pendleton
(74) *Attorney, Agent, or Firm* — Antonelli, Terry, Stout & Kraus, LLP.

(57) ABSTRACT

An optical disk apparatus for enabling to insert a multi-layered optical disk therein, which has plural numbers of recording layers, comprising: a spindle motor 42; an optical pickup 2; and a system controller 100 for controlling the optical pickup to move into a radial direction of the optical disk, as well as, for controlling the optical pickup so that a light-beam irradiated therefrom is focused upon either one of the plural numbers of recording layers of the optical disk, wherein when it is determined that the target layer to be accessed lies on a layer different from that, upon which the optical pickup focuses the light-beam at present, the light-beam irradiated from the optical pickup is shifted to the target layer, after being moved into a radial direction of said optical disk on the layer, upon which the light-beam irradiated therefrom is focused at present, up to an information recording area where the information of the target layer is recoded.

16 Claims, 6 Drawing Sheets

U.S. PATENT DOCUMENTS

| | | | |
|---|---|---|---|
| 2004/0105351 A1* | 6/2004 | Ueki | 369/30.23 |
| 2004/0233803 A1* | 11/2004 | Kawamae et al. | 369/47.3 |
| 2005/0270953 A1 | 12/2005 | Okada et al. | |

FOREIGN PATENT DOCUMENTS

| | | |
|---|---|---|
| JP | 09-120634 | 5/1997 |
| JP | 11-167729 | 6/1999 |
| JP | 11-339279 | 12/1999 |
| JP | 2000-0251271 | 9/2000 |
| JP | 2002-304750 | 10/2002 |
| JP | 2002-329334 | 11/2002 |
| JP | 2003-223759 | 8/2003 |
| JP | 2004-39019 | 2/2004 |
| JP | 2004-063025 | 2/2004 |
| WO | WO 2004/019326 | 3/2004 |

* cited by examiner

OPTICAL DISK APPARATUS AND A FOCUS-JUMPING CONTROL METHOD THEREOF

BACKGROUND OF THE INVENTION

1. Field of the Invention

The present invention relates to an optical disk apparatus for reproducing record information through irradiating a light-beam upon a disc-like information recording medium, which is called by an "optical disk", and in particular, relates to an optical disk apparatus for achieving stable read-out operation even to a multi-layered disk having plural numbers of recording layers, which are piled in the direction of a rotation axis of the disk, and a focus-jumping control method thereof.

2. Description of the Related Art

A disc-like information recording medium called by the "optical disk" and an optical disk apparatus being able to record/reproduce onto/from such the information recording medium, due to the characteristics of being non-contact in the operation, large in storage capacity, and enabling high-speed access, and further of being a replaceable and cheap medium, they are applied widely to be various kinds of recording/reproducing apparatuses; such as, a recording/reproducing apparatus for digital audio signal and/or digital video signal, for example, and further an external recording medium for a computer, etc.

On the other hand, with an optical disk, being the optical information recording medium to be used within such the apparatus, since it is remarkable in increasing of the storage capacity thereof, and then in addition to the disk of construction of a single layer of the conventional art, there are further proposed and put into practical use of various kinds of multi-layered optical disks, each of which forms the information recording layers in plural numbers thereof in the direction of the rotation axis thereof. As an example of such the multi-layered optical disks, for example, an optical disk of DVD two (2) layers for exclusive use of read-out, which is called by "DVD-DL (Dual layer)", has the plural number of layers, i.e., a layer "0" and a layer "1", on all of both the information recording layers are recorded with addresses in advance; therefore, for the optical disk apparatus side of reproducing those, even if shifting (i.e., focus-jumping) between those plural numbers of layers at any position on the radial direction of the disk, it is possible to confirm or identify the address on that layer.

For that reason, conventionally, within the disk drive (i.e., the optical disk apparatus) for exclusive use of read-out, normally, an operation of seeking to an address position of a target is conducted after conduction of the focus-jumping at the present address position, when conducting a seek control including the focus-jumping operation between those plural numbers of the recording layers.

Also other than those, such as, in Japanese Patent-Laying Open No. 2000-251271 (2000), for example, it is already known that, within a disk drive apparatus for recording or reproducing data onto/from the signal recording surfaces having the structure of plural numbers of layers, the focus-jumping is executed at a disk radial position corresponding to the address position near to an inner periphery side when conducting access between the separate signal recording surfaces (or, layers), for the purpose of reducing ill influence from swing or oscillation of the surface.

Further, for example, in Japanese Patent-Laying Open No. 2002-304750 (2002) is also disclosed an optical disk apparatus, for achieving both the focus-jumping to the target layer and the seeking to the target address, at the same time, correctively. However, in this patent document, observations are made upon an amount of shifting into the radial direction and a speed of shifting speed during the time-period of the focus-jumping, correctly, through an interpolation of a track-cross signal during the time-period of the focus-jumping that cannot be measured, which is executed at the same time of the seeking operation; thereby, achieving the correct seeking to the objected address with high speed and high performance.

BRIEF SUMMARY OF THE INVENTION

While on the other than this, in recent years, a two-layered write once optical disk, for example, being called by "DVD+R 8.5 GB", appears on the market and is put into practical use thereof. On such the two-layered optical disk called by "DVD+R 8.5 GB", recording is conducted directing from an inner periphery to an outer periphery on the layer "0", while it is conducted directing from the outer periphery to the inner periphery on the layer "1".

With such the two-layered optical disk, however, before coming into the condition that recording is already done on all the layers (i.e., the layer "0" and the layer "1") thereof, there necessarily exists a portion thereof, in which no address is recorded therein. For this reason, though it will be also explained in more details thereof later, in a case when trying to reproduce the record information by means of the optical disk apparatus according to the conventional art mentioned above, an optical pickup shifts or moves to the position where no address is recorded, and then no further address cannot be obtained thereafter; therefore, it is impossible for it to shift into the right or correct direction of the radius of disk, and there is brought about a drawback that the reproducing cannot be conducted any more.

Then, according to the present invention, being achieved by taking such the drawbacks of the conventional arts as was mentioned above into the consideration thereof, an object thereof is to provide an optical disk apparatus for reproducing an optical disk having plural numbers information recording layers thereon, in particular, being able to shift to the target address, with certainty, even when there exists a portion where no address is recorded therein, and further to provide a focus-jumping control method for that purpose thereof.

Namely, according to the present invention, for accomplishing the object mentioned above, there is provided an optical disk apparatus for enabling to insert a multi-layered optical disk therein, which has plural numbers of recording layers, comprising: a spindle motor for rotationally driving said optical disk; an optical pickup, being provided movable to said optical disk, for reading out signals from said optical disk inserted therein; a controller means for controlling said optical pickup to move into a radial direction of said optical disk, as well as, for controlling said optical pickup so that a light-beam irradiated therefrom is focused upon either one of the plural numbers of recording layers of said optical disk; and further a means for determining on whether a target layer to be accessed lies or not on a layer, upon which said optical pickup focuses the light-beam therefrom at present, wherein: when said determining means determines that the target layer to be accessed lies on a layer different from that, upon which said optical pickup focuses the light-beam at present, the light-beam irradiated from said optical pickup is shifted to the target layer, after being moved into a radial direction of said optical disk on the layer, upon which the light-beam irradiated therefrom is focused at present, up to an information recording area where the information of the target layer is recoded, by referring information recorded on said disk, from which it can be known whether the information is recorded or not.

Also, according to the present invention, within the optical disk apparatus as described in the above, preferably, said controller means shifts the light-beam irradiated from said optical pickup to said target layer, by confirming that the optical pickup reaches to said information recording area from that address, after moving said optical pickup in the radial direction of the optical disk from said layer, upon which the focusing is achieved at present, to said information recording area on said target layer, or said controller means calculates out a distance in the radial direction up to said information recording area on said target layer, and upon basis of said distance in the radial direction calculated out, it shifts the light-beam irradiated from said optical pickup to said target layer on said layer, upon which the focusing is achieved at present, up to within said information recording area on said target layer.

Further, according to the present invention, for accomplishing the object mentioned above, there is also provided a focus-jumping control method of an optical disk apparatus, for controlling an optical pickup of reading out signals from a multi-layered optical disk, which has plural numbers of recording layers, in a radial direction thereof, as well as, for controlling so as to focus upon any one of said plural numbers of recording layers, comprising the following steps of: a step for determining on whether a target layer to be accessed lies or not, on a layer differing from that, on which said optical pickup focuses a light-beam at present, when an optical disk inserted is the multi-layered optical disk; a step for moving the light-beam irradiated from said optical pickup up to an information recording area where information of said target layer is recorded, in a radial direction of the optical disk, on the layer upon which the light-beam is focused at present, by referring to information recorded on the disk, from which it can be known whether the information is recorded or not, when it is determined that the target layer lies on the different layer in said determining step; and a step for shifting said light-beam onto said target layer after said moving step mentioned above.

In addition thereto, according to the present invention, the focus-jumping control method, as described in the above, further comprising: a step for confirming that said light-beam reaches from that address to said information recording area, after moving in the radial direction of the optical disk up to said information recording area on said target layer, on the layer upon which the light-beam is focused at present, wherein the light-beam irradiated from said optical pickup is shifted onto said target layer, thereafter, or wherein a distance in the radial direction is calculated out, up to said information recording area on said target layer, in the step of moving in said radial direction, and upon basis of the distance in the radial direction calculated, the light-beam irradiated from said optical pickup is moved in the radial direction of the optical disk, up to within said information recording area on said target layer, on the layer upon which the light-beam is focused at present.

BRIEF DESCRIPTION OF THE DRAWINGS

Those and other objects, features and advantages of the present invention will become more readily apparent from the following detailed description when taken in conjunction with the accompanying drawings wherein.

DESCRIPTION OF THE PREFERRED EMBODIMENTS

Hereinafter, embodiments according to the present invention will be fully explained by referring to the attached drawings.

Figure 3:
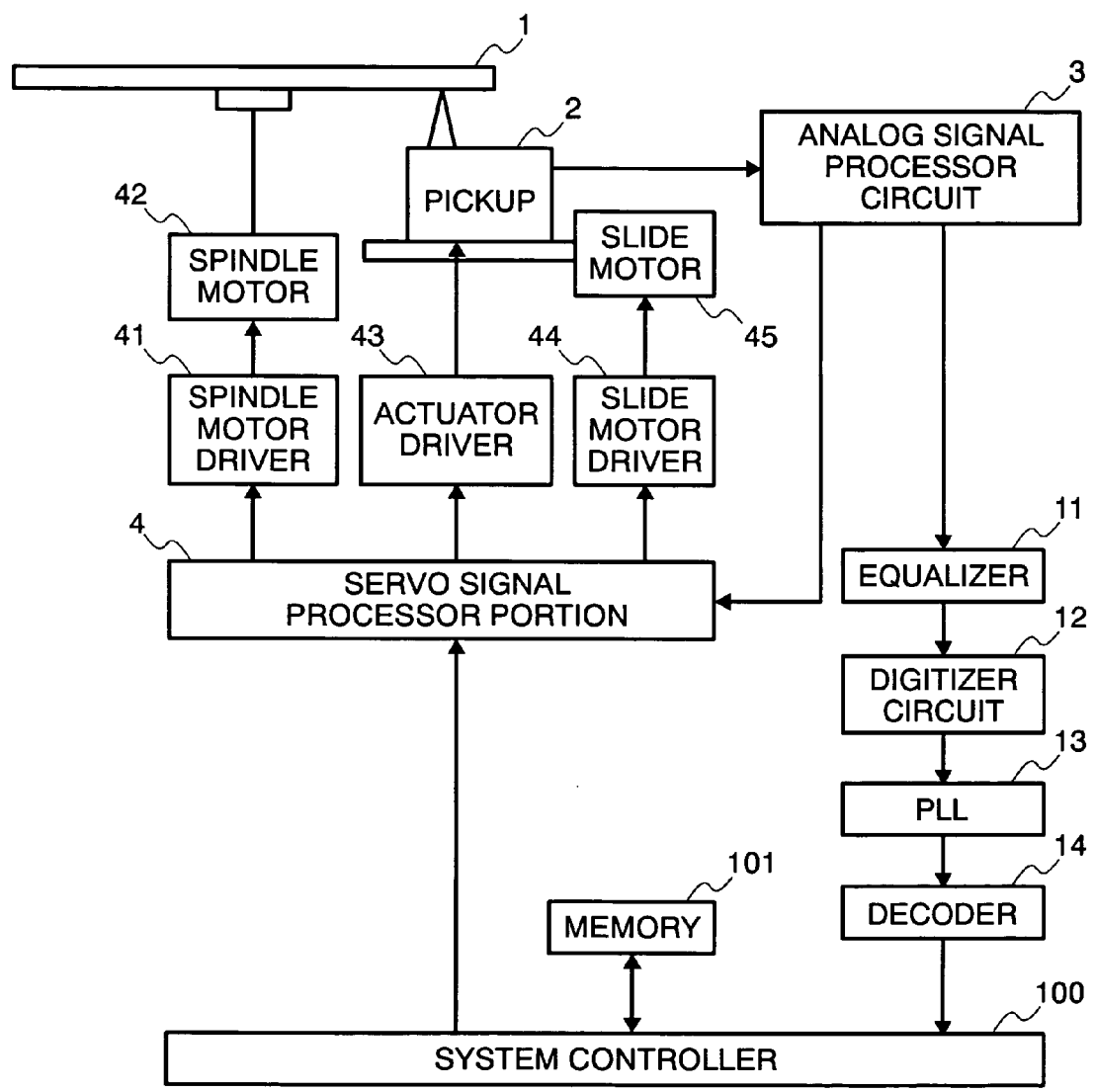
FIG. 3 is a block diagram for showing the detailed structures of the optical disk apparatus, according to an embodiment of the present invention.

First of all, FIG. 3 attached herewith is a block diagram for showing the detailed structures of an optical disk apparatus, according to an embodiment of the present invention. In this figure, a reference numeral 1 depicts an optical disk. On the other hand, an optical disk apparatus comprises an optical pickup 2 for reproducing an information signal from a recording surface of the optical disk 1. Herein, although not show in the figure, however it comprises: a focus lens for irradiating a laser beam upon the optical disk in the form of a spot thereof; a laser light source being constructed with a semiconductor laser, for generating the laser beam therefrom; and plural numbers of light receiving elements for receiving the laser beam reflected upon the recording surface of the optical disk mentioned above, so as to convert it into electric signals therein.

Also, a reference numeral 3 shown in FIG. 3 depicts an analog signal processing circuit for detecting a focus error signal and a tracking error signal from the electric signals provided from the plural numbers of the light receiving elements of the optical pickup 2 mentioned above, as well as, for reproducing information signals of the optical disk 1 mentioned above. Namely, as is apparent from the figure, this analog signal processing circuit 3 performs a predetermined signal processing upon the signals provided from the optical disk 1, and it further demodulates (or reproduces) the record information through an equalizer 11, a digitizer circuit 12, a PLL 13, and a decoder 14, so as to provide an output into a system controller 100, such as, of being constructed with a CPU or the like, for example. Further, a reference numeral 101 shown in the figure depicts a memory connected with the system controller 100 mentioned above, in which are memorized various kinds of software, to be executed by means of the said system controller 100.

At the same time, this analog signal processing circuit 3 performs a predetermined signal processing upon the basis of the input signals mentioned above, and it produces the focus error signal and the tracking error signal mentioned above, thereby providing those to a servo signal processor portion 4. This servo signal processor portion 4 controls a spindle motor 42 for rotationally driving the above-mentioned optical disk 1 through a spindle motor driver 41, upon the basis of the focus error signal and the tracking error signal inputted, and also controls focusing and/or shifting between the layers (i.e., the focus-jumping) of the optical pickup 2 through an actuator driver 43. Further, it drives/controls a slide motor 45 for driving the above-mentioned optical pickup 2 into the radical direction (i.e., the horizontal direction) of the disk through a slide motor driver 44. This servo signal processor portion 4 is also connected with the system controller 100 constructed with the CPU or the like; thus, the operation thereof is controlled by means of the system controller 100 mentioned above.

Following to the above, explanation will be made hereinafter, about the operations of the optical disk apparatus according to the one embodiment of the present invention, the brief structures of which was explained in the above.

Figure 4:
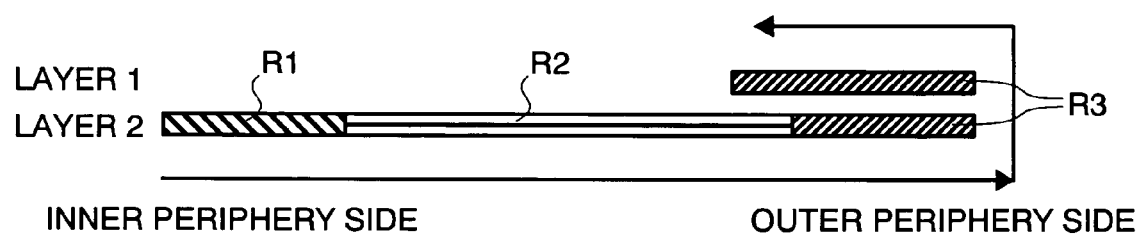
FIG. 4 is a view for explaining the condition of recording layers on a two-layered optical disk, being called by "DVD+R 8.5 GB", to be reproduced by the optical disk apparatus, according to the present invention.

First, by referring to FIG. 4 attached herewith, explanation will be made on the condition of the recoding layers on the two-layered optical disk called by "DVD+R 8.5 GB" mentioned above. Thus, as indicated by various kinds of oblique lines shown in the figure, on the two-layered optical disk called by "DVD+R 8.5 GB", recoding is conducted directing from an inner periphery (i.e., the left-hand side in the figure) into an outer periphery (i.e., the right-hand side in the figure) on a layer "0" thereof, sequentially. Namely, herein a recording portion R1 of first information is recorded, and next, a recording portion R2 of information is recorded. It further moves or shifts onto other layer, a layer "1", and in this instance, the recording is conducted directing from the outer periphery (i.e., the right-hand side in the figure) to the inner periphery (i.e., the left-hand side in the figure) (please see arrows shown in the figure). Further, the information record portion of the third time is indicted by "R3".

On the other hand, on the two-layered optical disk called by "DVD+R 8.5 GB", on which the information is recorded onto the recording layers thereof in such the manner as was mentioned above, explanation will be made about problems when conducting the shifting (i.e., the focus-jumping) between the layers thereof, as well as, the principle of the present invention, by referring to FIGS. 5(a) through 5(c). Still, in those figures, the left-hand side in the figure indicates the inner periphery side of the optical disk 1, while the right-hand side in the figure indicates the outer periphery side thereof.

Figure 5A:
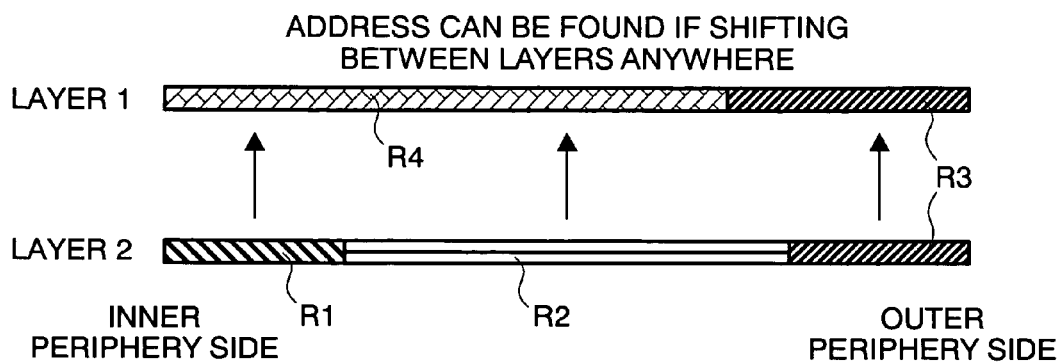
FIGS. 5($a$) through 5($c$) are views for explaining the principle of the present invention when shifting between the layers thereof, on the two-layered optical disk of being called by "DVD+R 8.5 GB" mentioned above.
Figure 5B:
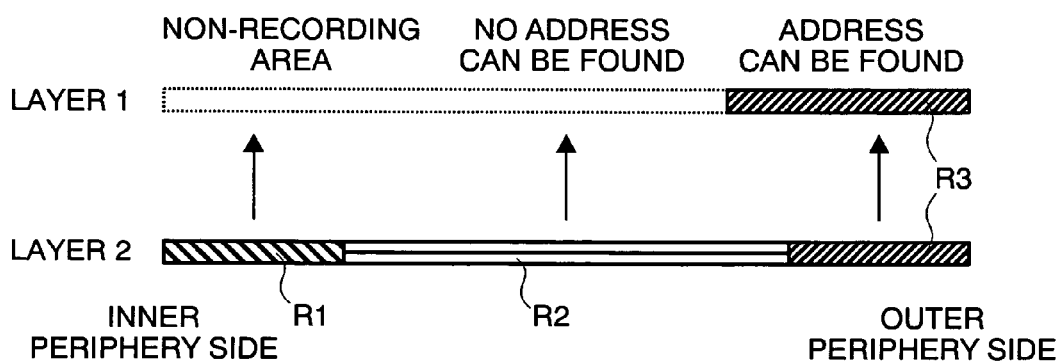

First of all, in FIG. 5(a) is shown the condition where recording is conducted or completed on all over the layers (recording portions R1 through R4) of the recording layers (i.e., the layer "0" and the layer "1"). In this instance, even if the shifting (i.e., the focus-jumping) is conducted at any place on the radial direction of the disk-like optical disk 1, it is possible to move, so as to make seeking to the information at a desired address, while shifting between those recording layers (i.e., layer "0" and the layer "1") freely, since the addresses are already recorded on the recording layers at destinations thereof. However, in this instance, the shifting (i.e., the focus-jumping) between the layers of the disk-like optical disk 1 is executed by the means of the system controller 100 shown in FIG. 3 mentioned above; in more details thereof, it is achieved through control of the position of the focus lens for irradiating the laser beam in the form of a spot upon the optical disk 1, in the optical pickup 2 mentioned above, and in particular, by controlling driving current supplied to voice coils thereof.

However, on the DVD+R 8.5 GB mentioned above, before it comes into the condition where all the layers thereof are recorded, there may be sometimes caused a condition that, the information is recorded on the one recording layer "0" and therefore the addresses for it is also recorded in a part thereof, however on the other recording layer "1", there is recorded the information only in a part thereof but recording is not yet made on the other portions thereof (no recording portion R4), therefore existing non-information recording portion where no address is recorded therein yet. In such the case, when conducting the shifting (i.e., the focus-jumping) between the layers, in particular, in the non-information recording area on the layer "1", as indicated by an arrow in the figure, however; no address is recoded on that layer onto which the shifting is made, i.e., the layer "1". For this reason, with the optical disk apparatus for reproducing the optical disk, shifting into the position where no address is recorded, thereafter, it is impossible to move the optical pickup into the correct radial direction of the disk, thereby bringing about a drawback that the reproducing operation cannot be done.

Figure 5C:
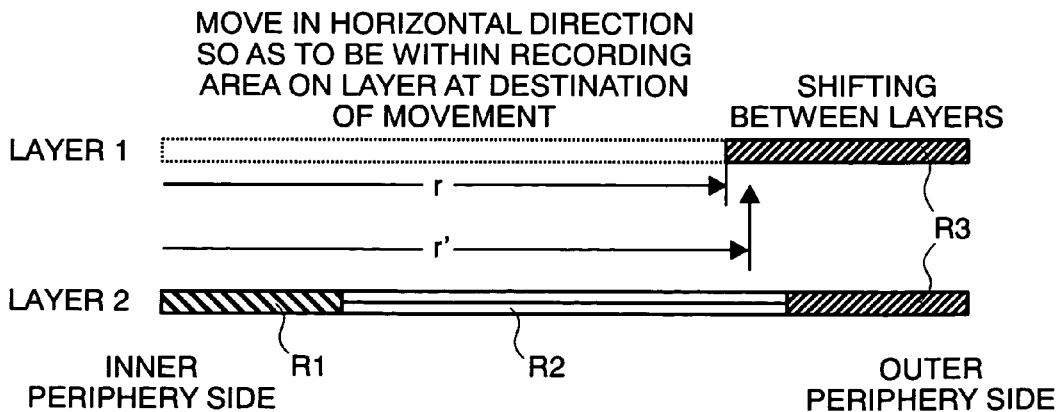

Then, according to the present invention, as is shown in FIG. 5(c), on the two-layered optical disk, such as, the so-called "DVD+R 8.5 GB", for example, in particular, in case when there is a portion where no information is recorded on that target layer (in this case, the layer "1"), moving or shifting between the layers (such as, the focus-jumping) is inhibited within this area of recording non-information therein; i.e., first the shifting is carried out into the radial direction of the disk on the present layer (in this case, the layer "0"), thereby shifting into the recorded area on the layer "1" as the target layer, and thereafter, it moves (or jumps) onto the target layer "1". With this, it is possible to conduct the shifting between the layers (i.e., the focus-jumping) only within the area thereof, where the information is recorded, with certainty, and therefore, the optical disk apparatus is always able to perform the reproducing operation of recorded information, even on the two-layered optical disk, such as, the so-called "DVD+R 8.5 GB" mentioned above, with certainty, irrespective of the recording condition thereof.

Figure 1:
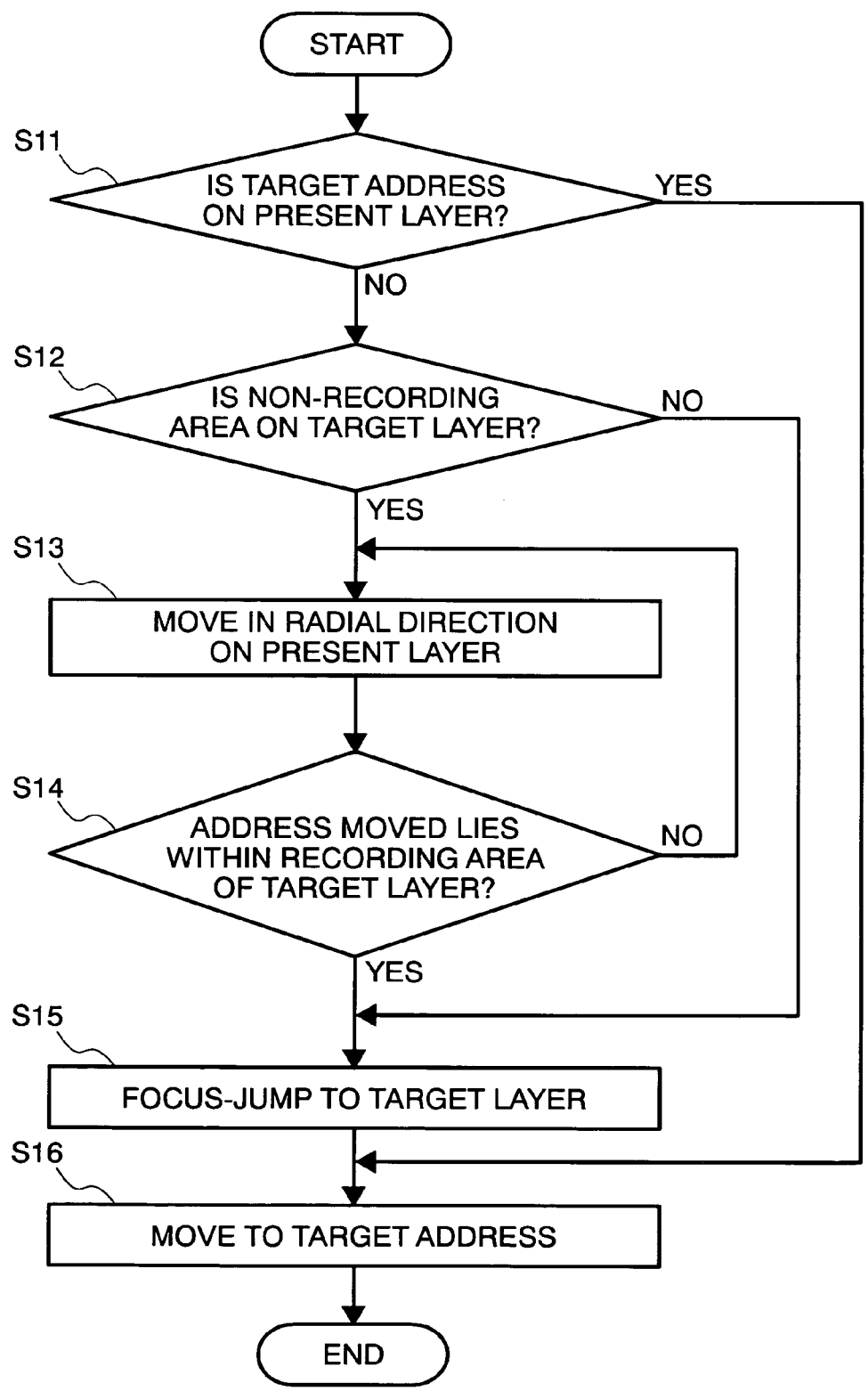
FIG. 1 is a flowchart for showing an example of a focus-jumping control method in an optical disk apparatus, according to an embodiment of the present invention.

Following to the above, explanation will be given in more details thereof, about the detailed embodiment of the focus-jumping operation within the optical disk apparatus, according to the one embodiment of the present invention, which is executed upon the basis of the principle of the shifting between layers (i.e., the focus-jumping) mentioned above, by referring to the flowchart shown in FIG. 1 attached. However, the operation is executed by means of the system controller 100 shown in FIG. 3 mentioned above, which is constructed with the CPU, etc.

Further, the focus-jumping operation mentioned above is executed, for example, in a case when the system controller tries seeking to a desired address between the plural numbers of recording layers (for example, the layer "2" and the layer "1" in the above), etc. First, when the process is started, it is determined on whether the target address lies or not on the layer (i.e., the present layer, for example, the layer "2"), upon which the optical pickup is now focusing (step S11). As a result of this, if it is decided that the target layer lies on the present layer ("Yes"), the process moves into a step S16, so as to move to the address targeted within the same layer (i.e., the present layer), but without executing the focus-jumping (namely, there is no necessity of shifting between the layers), thereby completing the process.

On the other hand, if it is determined that the target address does not lie on the present layer ("No") in the step S11 mentioned above, determination is further made on whether there is an area or not, where no information is recorded therein, on the target layer (in this case, the layer "1") (step S12). As a result thereof, in a case when determining that non-recorded area is not remained on the target layer ("No"); in other words, since recording was already done on all over the layer "1", as being the target layer, and therefore, since the address is already recorded if shifting between the layers at any position; therefore, the process moves into a step S15, wherein the focus-jumping is executed into the target layer (i.e., the layer "1"), and further shifting to the target address (step S16), thereby completing the process.

Figure 6:
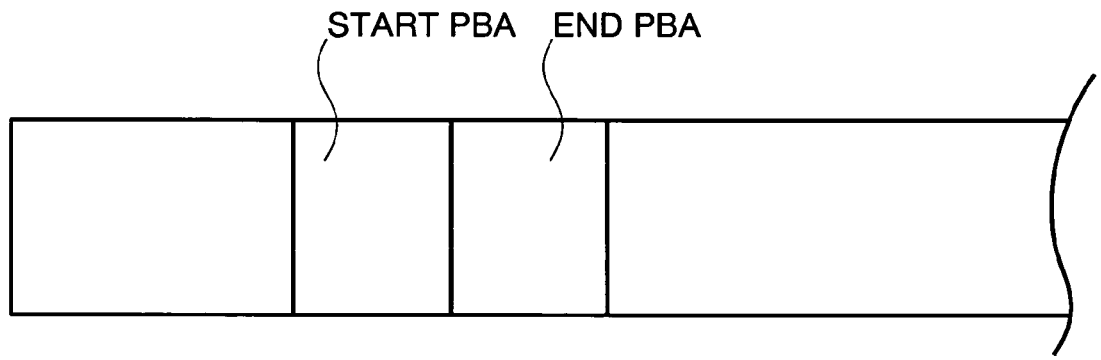
FIG. 6 is a view for explaining an example of a recording format of the two-layered optical disk of being called by "DVD+R 8.5 GB" mentioned above.

On the contrary to the above, in a case if it is determined that there lies the non-information recorded area on the target layer, i.e., the layer "1", ("Yes") in the step S12 mentioned above, shifting is conducted into the radial direction of the disk, on the present layer, i.e., the layer "0" (step S13). However, in this instance, normally, the information recorded onto the optical disk has, as is apparent from the format thereof shown in FIG. 6 attached herewith, a portion where an end address (for example, End PBA <Physical Block Address> on the two-layered optical disk, such as, the "DVD+R 8.5 GB") is recorded, following to a head portion thereof (for example, a code portion indicative of a kind of information, etc.), as well as, a start address of that information recorded thereon (i.e., Start PBA (Physical Block Address); therefore, it is possible to notice or recognize the recording area of information on the target layer, i.e., the layer "1". Then, with using this information, the optical pickup is shifted into the radial direction within the area where the information is recorded.

Thereafter, it is determined on whether the address, to which the pickup is shifted in the step S13 mentioned above, lies or not, within a recording area of the target layer, i.e., the layer "1" (step S14). Thus, with this, it is ascertained that the optical pickup reaches within the recording area of the target layer, i.e., the layer "1", and in a case if it does not reach thereto yet ("No"), the process turns back to the step S13 mentioned above, thereby further shifting it into the radial direction. And, in a case when it is determined that it reaches ("Yes"), the process conducts the focus-jumping onto the target layer (i.e., the layer "1") (step S15), and further shifting it to the target address (step S16), thereby completing that process.

Namely, in accordance with the focus-jumping control method as was mentioned above, even when reproducing the two-layered optical disk, such as, the "DVD+R 8.5 GB" mentioned above, for example, and in particular, in the case when there is still remained non-recorded portion in a part thereof, however the optical pickup will never falls into the condition of being unable to move into the correct radial direction of the disk since it shifts into the position where no address is recorded; therefore, it is always possible to move into the desired address, so as to reproduce the information, with certainty.

Figure 2:
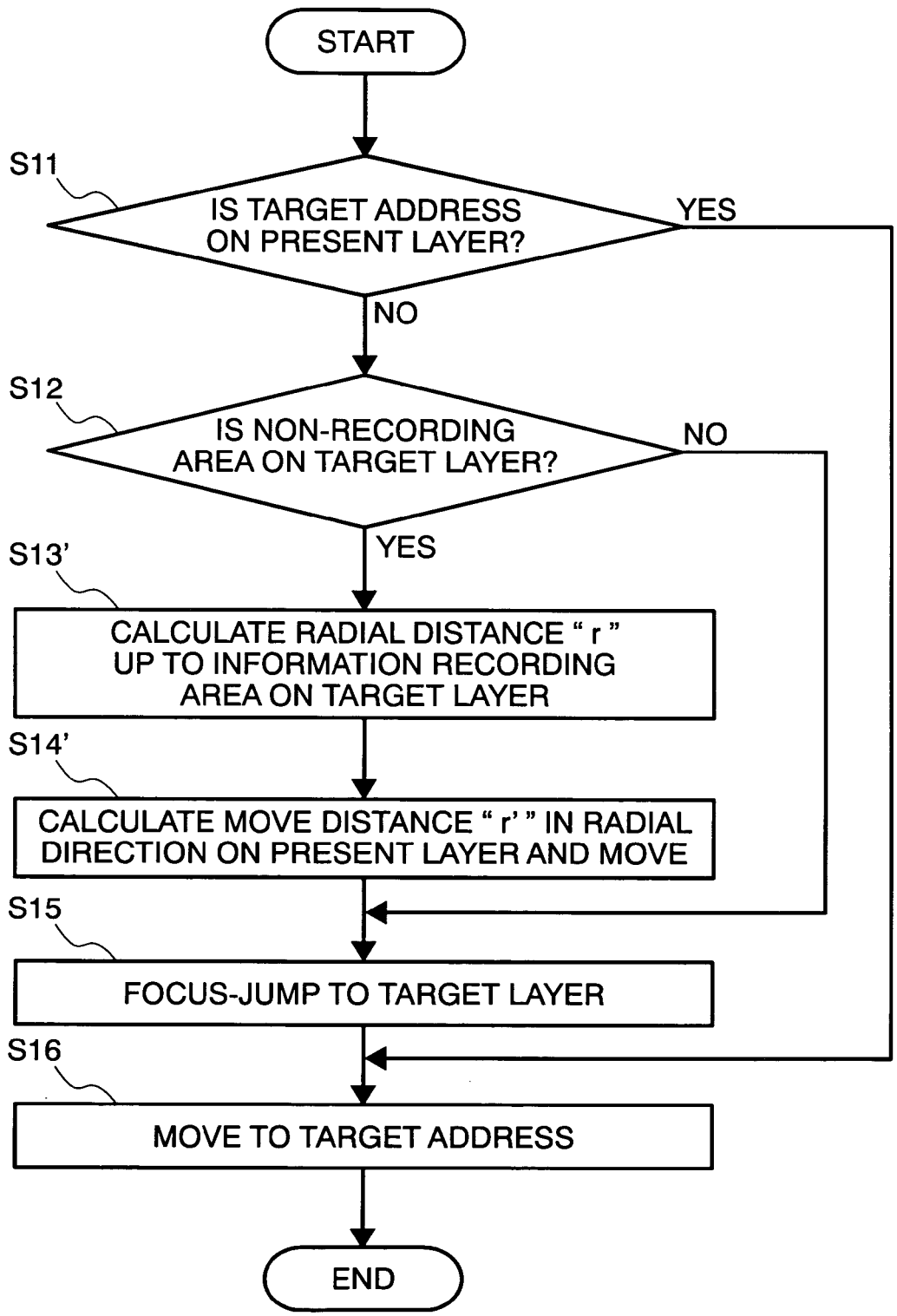
FIG. 2 is also a flowchart for showing other example of the focus-jumping control method in the optical disk apparatus, according to the present invention.

Next, hereinafter will be made explanation, on other embodiment of the focus-jumping control method, according to the present invention mentioned above, by referring to the flowchart shown in FIG. 2 attached herewith. Thus, with the other embodiment, the following steps S13' and S14' are executed in the place of determining processes of the steps S13 and S14 shown in the above.

Namely, when it is determined that the target address does not lie on the present layer ("No") in the step S11 mentioned above, and further when it is determined that there is remained the non-recording area on the target layer (i.e., the layer "1") in the step S12, then a distance "r" in the radial direction is calculated out (step S13'), up to the information recording area on the target layer, and thereafter, upon the basis of the distance in the radial direction calculated out, a distance "r'" is calculated out for shifting or moving the optical pickup on the present layer, so as to move it (step S14'). Please see FIG. 5(c) mentioned above.

In this instance, as was mentioned previously, since the position of the information recording layer on the target layer (i.e., the layer "1") can be known, easily, from the end address (i.e., the End PBA (Physical Block Address)) recorded on the optical disk, therefore, the distance "r'" in the radial direction up to the final position of the information recording layer on this layer (the layer "1"), i.e., up to the left-hand side end of the information recording portion R3 in FIG. 5(c) mentioned above, so as to set up the shifting distance "r'" into the radial direction on the present layer, being larger than that distance "r" in the radial direction, a little bit (for example, by about 1 mm), as is expressed by the following equation:

$$r'=r+\Delta r>r \text{ (where, } \Delta r \text{ is about 0.5 to 1 mm)}$$

With this, the optical pickup can reach within the recording area on the target layer, i.e., the layer "1", with certainty. Thereafter, in the similar manner to that mentioned above, the process performs the focus-jumping onto the target layer (i.e., the layer "1") (step S15), and further, shifts the optical pickup to the target address (step S16), thereby completing the process.

The explanation was made upon the two-layered optical disk, such as, the "DVD+R 8.5 GB", to be reproduced, as an example thereof, in the embodiment mentioned above, and therefore, the recording on the other layer, i.e., the layer "1" is performed, directing from an outer periphery to an inner periphery of the disk, as was explained by referring to FIG. 3 mentioned above. However, according to the present invention, not restricted to the optical disk of such the re-writing method, but it may be applied onto a disk, for example, wherein the recording onto the other layer, i.e., the layer "1" is also performed directing from the inner periphery to the outer periphery of the disk, in the similar manner to that on the layer "0". However, in such the case, it is apparent for the person skilled in the art, that the relationship between the distance "r" in the radial direction up to the final position of the information recording layer on the layer "0" mentioned above and the shifting distance "r'" in the radial direction on the present layer, should be set up in reverse to that mentioned above, as will be mentioned below:

$$r'=r-\Delta r<r \text{ (where, } \Delta r \text{ is about 0.5 to 1 mm)}$$

Namely, with the focus-jumping control method according to this other embodiment, it is also possible to reproduce the information after conducting the focus-jumping, while shifting the optical pickup to the desired address, always, with using the addresses thereof, in the similar manner to that mentioned above, in particular, even if there is non-recording portion in a part thereof, when reproducing the two-layered optical disk, such as, the "DVD+R 8.5 GB" mentioned above.

As is apparent from the present invention mentioned above, with the optical disk apparatus and the focus-jumping control method thereof according to the present invention, the said optical disk is within the optical disk apparatus for reproducing the optical disk, which has plural numbers of the information recording layers, and it is possible to move or shift the optical pickup to the address of the target, with certainty, even if there is a portion where no address is recorded in a part thereof, thereby keeping the reproduction operation thereof, with certainty.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disk reproducing apparatus for enabling reproduction from a multi-layered write once optical disk of recordable format in which the optical disk has plural numbers of recording layers and in which data is recorded sequentially on the optical disk so as to be continuous over an entire continuous recorded data region of a user data region which includes multiple recording layers of the optical disk, comprising:
  a spindle motor for rotationally driving the optical disk;
  an optical pickup, being provided movable to the optical disk, for reading out signals from the optical disk;
  a controller device which controls the optical pickup to move in a radial direction of the optical disk, and controls the optical pickup so that a light-beam irradiated therefrom is focused upon one of the plural numbers of recording layers of the optical disk;
  wherein the controller device controls the optical pickup so as to enable reproduction of an end address number indicating a final recording position of the entire continuous recorded data region of the user data region which includes multiple recording layers of the multi-layered write once optical disk of recordable format in which data is recorded sequentially and continuously on the optical disk, the end address number being recorded in a particular area on the optical disk, and to enable retrieval of information indicating which area of the optical disk is a first area with which the optical disk reproducing apparatus retrieves an address, and which area of the optical disk is a second area with which the optical disk reproducing apparatus cannot retrieve an address, in accordance with the reproduced end address number so that the end address number represents a boundary between recorded and non-recorded data of the user data region which includes multiple recording layers;
  wherein the controller device determines, in accordance with the reproduced end address number, whether a target layer to be accessed lies on a present layer upon which the optical pickup focuses a light-beam therefrom or a different layer, and whether a present radial position of the optical pickup is included in the second area of the target layer;
  wherein when the target layer is on the different layer and the present radial position of the optical pickup is included in the second area of the target layer, the controller device determines a shifting distance in the radial direction based on the end address number and controls the optical pickup to move in the radial direction based on the shifting distance to a radial position which is included in the first area of the target layer; and
  wherein the controller device controls the optical pickup to shift the light-beam to the target layer.

2. The optical disk reproducing apparatus, as described in the claim 1, wherein:
  the controller device shifts the light-beam irradiated from the optical pickup to the target layer, by confirming that the optical pickup reaches to the first area from the end address number, after moving the optical pickup in the radial direction of the optical disk from the layer, upon which the focusing is achieved at present, to the first area on the target layer.

3. The optical disk reproducing apparatus, as described in the claim 1, wherein:
  the controller device calculates out a distance in the radial direction up to the first area on the target layer, and upon basis of the distance in the radial direction calculated out, the controller device shifts the light-beam irradiated from the optical pickup to the target layer from the layer, upon which the focusing is achieved at present, up to within the first area on the target layer.

4. The optical disk reproducing apparatus, as described in the claim 1, wherein the end address number is recorded in a location next to a header portion.

5. The optical disk reproducing apparatus, as described in the claim 1, wherein the end address number is an end physical block address.

6. The optical disk reproducing apparatus, as described in the claim 1, wherein the controller device controls the optical pickup so as to enable retrieval of information indicating which area of the optical disk is the first area and which area of the optical disk is the second area in accordance with the reproduced end address number without scanning of the optical disk.

7. The optical disk reproducing apparatus, as described in the claim 1, wherein the controller device controls the optical pickup so as to enable retrieval of information indicating which area of the optical disk is the first area and which area of the optical disk is the second area in accordance with the reproduced end address number without scanning of the optical disk to detect optical properties of the optical disk.

8. The optical reproducing apparatus, as described in claim 1, wherein the end address number is different from the address retrieved or not retrieved by the optical disk reproducing apparatus.

9. A focus-jumping control method of an optical disk reproducing apparatus, for controlling an optical pickup of reading out signals from a multi-layered write once optical disk of recordable format in which the optical disk has plural numbers of recording layers and in which data is recorded sequentially on the optical disk in a radial direction thereof so as to be continuous over an entire continuous recorded data region of a user data region which includes multiple recording layers of the optical disk, and for controlling so as to focus upon any one of the plural numbers of recording layers, comprising the steps of:
  reproducing an end address number indicating a final recording position of the entire continuous recorded data region which includes multiple recording layers of the multi-layered write once optical disk of recordable format in which data is recorded sequentially and continuously on the optical disk, the end address number being recorded in a particular area on the optical disk and representing a boundary between recorded and non-recorded data of the user data region which includes multiple recording layers;
  retrieving of information indicating which area of the optical disk is a first area with which the optical disk reproducing apparatus retrieves an address, and which area of the optical disk is a second area with which the optical disk reproducing apparatus cannot retrieve an address, in accordance with the reproduced end address number;
  determining, in accordance with the reproduced end address number, whether a target layer to be accessed lies on a present layer upon which the optical pickup focuses a light-beam therefrom or a different layer;
  determining, in accordance with the reproduced end address number, whether a present radial position of the optical pickup is included in the second area of the target layer;
  wherein when the target layer is on the different layer and the radial position of the optical pickup is included in the second area of the target layer, determining a shifting distance in the radial direction based on the end address number, and moving the optical pick in the radial direction based on the shifting distance to a radial position which is included in the first area of the target layer; and
  shifting the light-beam to the target layer.

10. The focus-jumping control method, as described in the claim 9, further comprising:

a step for confirming that the light-beam reaches the recording area, after moving in the radial direction of the optical disk up to the first area on said target layer, on the layer upon which the light-beam is focused at present, wherein the light-beam irradiated from the optical pickup is shifted onto the target layer, thereafter.

11. The focus-jumping control method, as described in the claim 9, wherein a distance in the radial direction is calculated out, up to the first area on the target layer, in the step of moving in the radial direction, and upon basis of the distance in the radial direction calculated, the light-beam irradiated from said optical pickup is moved in the radial direction of the optical disk, up to within the first area on the target layer, on the layer upon which the light-beam is focused at present.

12. The focus-jumping control method, as described in the claim 9, wherein the end address number is recorded in a location next to a header portion.

13. The focus-jumping control method, as described in the claim 9, wherein the end address number is an end physical block address.

14. The focus-jumping control method, as described in the claim 9, wherein the information is retrieved indicating which area of the optical disk is the first area and which area of the optical disk is the second area in accordance with the reproduced end address number without scanning of the optical disk.

15. The focus-jumping control method, as described in the claim 9, wherein the information is retrieved indicating which area of the optical disk is the first area and which area of the optical disk is the second area in accordance with the reproduced end address number without scanning of the optical disk to detect optical properties of the optical disk.

16. The focus-jumping method, as described in claim 9, wherein the end address number is different from the address retrieved or not retrieved by the optical disk reproducing apparatus.

* * * * *